United States Patent [19]

Schmitmann

[11] 4,087,686

[45] May 2, 1978

[54] X-RAY DIAGNOSTIC APPARATUS FOR X-RAY FILM PHOTOGRAPHS WITH AN AUTOMATIC EXPOSURE TIMER

[75] Inventor: Herbert Schmitmann, Weiher, Germany

[73] Assignee: Siemens Aktiengesellschaft, Berlin & Munich, Germany

[21] Appl. No.: 727,401

[22] Filed: Sep. 29, 1976

[30] Foreign Application Priority Data

Nov. 10, 1975 Germany ............................ 2550437

[51] Int. Cl.$^{2}$ ............................................ G03B 41/16

[52] U.S. Cl. .................................. 250/322; 250/401; 250/413

[58] Field of Search ........................ 250/322, 401, 413

[56] References Cited

U.S. PATENT DOCUMENTS

| | | | |
|---|---|---|---|
| 3,775,669 | 11/1973 | Baker | 250/322 X |
| 3,911,273 | 10/1975 | Franke | 250/401 X |
| 3,916,251 | 10/1975 | Hernandez et al. | 250/401 X |
| 3,991,314 | 11/1976 | Schmitman et al. | 250/413 X |

*Primary Examiner*—Archie R. Borchelt

*Attorney, Agent, or Firm*—Hill, Gross, Simpson, Van Santen, Steadman, Chiara & Simpson

[57] ABSTRACT

In the illustrated embodiments a logical switching member is energized from a common power supply at the time that a manual switch is actuated for initiating an x-ray exposure. If the logical switching member does not receive an inhibiting signal within a definite inhibition interval less than a minimum exposure time, the switching member reaches a normal operating state and supplies its logical output signal to turn off the x-ray source. The inhibiting signal is not generated if the radiation detector fails to receive radiation from the x-ray source, or if there is a circuit failure in the inhibiting signal generating circuitry connected to the input of the switching member, or if the dosage fails to increase at least at a selected minimum rate during the inhibition time interval.

4 Claims, 4 Drawing Figures

X-RAY DIAGNOSTIC APPARATUS FOR X-RAY FILM PHOTOGRAPHS WITH AN AUTOMATIC EXPOSURE TIMER

BACKGROUND OF THE INVENTION

The invention concerns an x-ray diagnostic apparatus for making x-ray film photographs, with an automatic exposure timer which contains a radiation detector, a signal processing circuit for the output signal of the radiation detector, and a switch-off device for the x-ray tube, which receives a switch-off signal from the signal processing circuit when the x-ray film has been exposed to a predetermined radiation dose.

In an x-ray diagnostic apparatus of this type, it is possible for an exposure to proceed inadvertently up to a maximum time limit due to an operating error or circuit malfunction. Upon reaching this maximum time limit, the x-ray tube is switched off by means of an overload protection device. Faulty operation of this type can be due to a defective amplifier in the automatic exposure timer, for example. It is also possible, however, that the user has forgotten to dial the desired radiation measurement chamber of the radiation detector. Finally, it is also conceivable for the primary radiation diaphragm of the x-ray tube to be closed while the tube is switched on. In all these instances, the switch-off device of the automatic exposure timer does not receive any switch-off signal. The patient can thus be burdened with an undesirably high radiation dose. Moreover, the x-ray tube is loaded up to a very high limit.

SUMMARY OF THE INVENTION

The object which is the basis of the invention is to produce an x-ray diagnostic apparatus of the type initially described herein wherein, in spite of the existence of an operating fault, a burdening of the patient with an excessively high radiation dose and an excessively increased load on the x-ray tube, as compared with the selected value, is precluded.

As specified by the invention, this problem is solved in that signal processing circuitry is provided containing a switching circuit which switches off the x-ray tube if, after it has been switched on, a signal is produced by the radiation detector which is below a predetermined limit, or if no signal is produced. In the inventive x-ray diagnostic apparatus, a switching circuit tests whether, after an x-ray photograph has been initiated, a proper output signal is actually produced by the radiation detector of the automatic exposure timer. If this signal is lacking, or if it is below a predetermined limit, an excessively high radiation load on the patient and an excessively high load on the x-ray tube is prevented by means of a rapid switching off of the x-ray tube.

Other objects, features and advantages of the invention will be apparent from the following detailed description taken in connection with the accompanying sheet of drawings which illustrate two exemplary embodiments by way of illustration and not by way of limitation.

DETAILED DESCRIPTION

Figure 1:
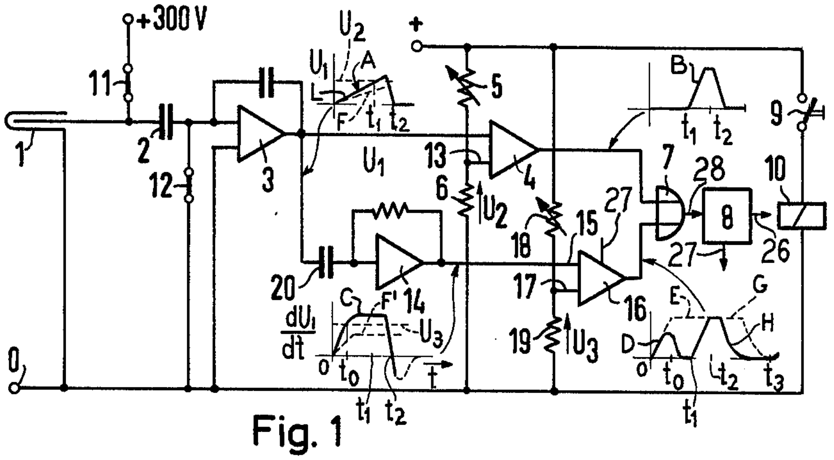
FIG. 1 is an electric circuit diagram illustrating a first embodiment in accordance with the present invention.

FIG. 1 illustrates a radiation measurement chamber 1 of an x-ray automatic exposure timer which is connected to a coupling capacitor 2. During an x-ray exposure, this capacitor 2 serves as an externally non-influenced voltage source for radiation measurement chamber 1. An operational amplifier 3, which is connected as an integrator, is connected to the output side of coupling capacitor 2. The output signal of said operational amplifier 3 is fed to one input of a differential amplifier 4. A constant voltage $U_2$, which is tapped from a voltage divider 5, 6, is connected to the other input of the differential amplifier 4. The output signal of differential amplifier 4 operates a switch-off device 8 for the x-ray tube via an OR gate 7. When an x-ray exposure is initiated, a switch 9 is manually closed, for example, and serves to connect a source of actuating voltage with a winding 10 of a relay. This relay has normally closed contacts 11 and 12, which are opened with minimum delay in response to energization of winding 10.

Figure 3:
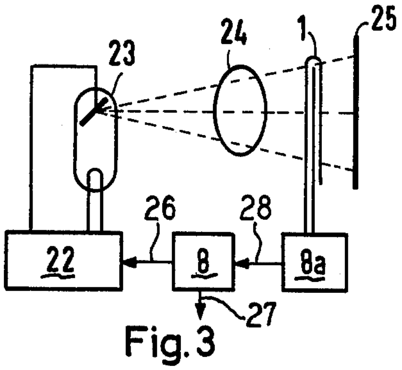
FIG. 3 is a diagrammatic illustration of an x-ray diagnostic apparatus including a signal processing circuit in accordance with the present invention.

If switch 9 is closed at the beginning of an exposure cycle, winding 10 is energized and opens contacts 11 and 12. Previously charged capacitor 2 has its input terminal disconnected from a three hundred volt source and its output terminal disconnected from ground potential, so that the charged capacitor 2 is then free of its charging circuit and transmits the current flow of radiation detector 1, which is an ionization chamber in the example, to integration amplifier 3. The integration of the current flow to the input of amplifier 3 with respect to time brings about a voltage rise at the amplifier output as diagrammatically indicated at A in FIG. 1, in the absence of faulty operation. This voltage rise is a measure of the radiation dose which has impinged on the ionization chamber 1 (since the opening of contacts 11, 12) and thus on the x-ray film located in front of said ionization chamber (as indicated in FIG. 3). When the output voltage $U_1$ of amplifier 3 has reached a value equal to $U_2$ which is the voltage value selected for application to input 13 of differential amplifier 4, the differential amplifier 4 produces an output signal as indicated at B in FIG. 1 which brings about a switching off of the x-ray tube and the completion of an exposure, via OR gate 7 and switch-off device 8. Voltage $U_2$ is selected (for example by means of selection of the resistance value of resistance means 5, FIG. 1) such that the radiation dose corresponding thereto results in an optimum film density.

The output voltage of operational amplifier 3 ($U_1$) is, in addition, fed to one input 15 of a second differential amplifier 16 via an additional amplifier 14. A constant voltage $U_3$ is connected to the second input 17 of the differential amplifier 16. This voltage $U_3$ is tapped from a voltage divider 18, 19. A capacitor 20 is connected in series at the input of amplifier 14 so that components 14, 20, form a differentiating circuit, and a signal (as diagrammatically indicated by wave form C in FIG. 1) is supplied to input 15 which corresponds to the differential quotient, that is the derivative of output voltage $U_1$ with respect to time ($dV_1/dt$).

In fault free operation, it is necessary that the differential quotient ($dU_1/dt$) reaches or exceeds a predetermined value ($U_3$) within a time interval ($t_0$ milliseconds) corresponding to a timing cycle of the processing circuitry which starts at the beginning of the photographic process. In FIG. 1, a power supply potential may be supplied to differential amplifier 16 at the same time that operating potential is supplied to the x-ray tube so as to initiate the timing cycle of the processing circuit. The predetermined potential value which must be reached by the output (C) of amplifier 14 is selected in advance by means of the voltage divider 18, 19 (for example by the selection of the resistance value of resistance means 18). In the absence of a fault, differential amplifier 16 does not produce any output signal. However, if voltage $U_1$ does not rise sufficiently rapidly (so as to provide a minimum slope L for wave form A, FIG. 1), the differential quotient (as represented by wave form C, FIG. 1) will be below the selected voltage value $U_3$, and differential amplifier 16 at the end of its timing cycle will supply a switch-off signal (as indicated by dash line wave form E, FIG. 1) to switch off device 8 via OR gate 7 to terminate the photographic process. By suitably selecting voltage $U_3$, this termination can take place within a very short period of time after initiation of the photographic process (that is at a time $t_0$ milliseconds after switch-on of the supply voltage to the x-ray tube and to differential amplifier 16) so that an excessively high radiation load on the patient and an excessively high loading of the x-ray tube will not occur. Even if, after a photographic process has been initiated, absolutely no output signal is delivered by amplifier 3, because the amplifier 3 is defective, or because the primary radiation diaphragm is closed, for example, a blocking occurs in the manner illustrated. Thus, for example, if instead of wave form A in FIG. 1 with a limiting slope of L, a wave form as indicated by dash line F is produced at the output of amplifier 3, the corresponding signal as indicated at F′ will not reach the minimum predetermined potential $U_3$, and accordingly the signal as indicated by wave form E at the output of differential amplifier 16 will not be inhibited. Similarly if the output of amplifier 3 is zero volts, the output of amplifier 14 will also be zero volts, and the timing cycle of differential amplifier 16 will not be overridden. On the other hand, so long as the output from integrating amplifier 3 has the minimum slope L, the output of amplifier 14 will exceed the predetermined voltage level $U_3$ as indicated by wave form C, so that the amplifier 14 will supply an inhibition signal to differential amplifier 16 preventing the amplifier 16 from supplying a switch-off signal at the end of its timing cycle.

In the wave forms given in FIG. 1, by way of example, it is assumed that the elements have a direct current coupling path except for the case where the capacitor 20 is indicated between components 3 and 14. At the end of an exposure operation, switch 9 may be manually released so as to automatically return to an open circuit condition as shown in FIG. 1, deenergizing relay 10 and returning contacts 11 and 12 to their closed condition as shown in FIG. 1. At this time the input to amplifier 3 is zero volts, and the output of amplifier 3 thus returns to zero volts as indicated at time $t_2$. When wave form A returns to zero as indicated, the input at 13 of amplifier 4 will exceed the voltage at the other input, so that wave form B at the output of amplifier 4 will also return to zero volts at time $t_2$. The wave form C at the output of amplifier 14 will have a negative going pulse at time $t_2$ followed by an output of zero volts. With the input to amplifier 16 at 15 at zero volts, the output of amplifier 16 would tend to assume a logical one voltage level as indicated at G, but it has been assumed that the supply voltage to amplifier 16 would be removed at the time of switch-off of the x-ray source in response to the switch-off signal as indicated at B at the output of amplifier 4. Accordingly, for the exemplary embodiment, the actual output wave form from amplifier 16 is indicated in solid line at H, a further exposure cycle being assumed to have been initiated at time $t_3$. In any event, as represented by wave form G, it is necessary for the illustrated operation that amplifier 16 be operated so as to have a zero volt output at the beginning of each exposure cycle (such as at time zero seconds and at time $t_3$ seconds), the time thereafter in which the amplifier 16 will provide a logical one output level as indicated at E being correlated with the characteristics of the differentiating circuit 14, 20, so that under conditions of a normal exposure, a minimum corresponding slope L of wave form A will produce a wave form C at the output of amplifier 14 within a time interval $t_0$ which is less than the response time of amplifier 16, so that such minimum normal output of amplifier 14 will inhibit the response E of amplifier 16, and instead drive amplifier 16 to its logical zero output level as indicated by wave form D, such logical zero output level being assumed to be at zero volts for the illustrated wave form simply for a convenient illustration.

For the sake of a specific example, it may be assumed that switch-off device 8 includes an electronic circuit with a power transistor which is rendered conducting in response to a closure of a switch 9, the conducting condition of such power transistor causing the closure of an electromechanical switch which, in turn, causes the connection of operating supply voltage to output conductors such as indicated at 26 and 27 in FIG. 1. For the sake of a specific example, it may be assumed that the operating supply potential connected with conductor 27 at turn-on of the x-ray source may serve as the source of positive operating potential for differential amplifier 16 of FIG. 1, the negative operating potential remaining connected with the amplifier 16 so long as the common power supply for the components 3, 4, 7, 14 and 16 is operative. The OR gate 7 is a direct current level operated gate which is reliably operated by the waveform E regardless of any normal power supply variations. The common power supply may also operate the power transistor (such as 30, FIG. 3A) and the electromechanical switch (such as S, FIG. 3A), so that any failure of the power supply would tend to release switch S and remove power from the x-ray source as well.

Figure 2:
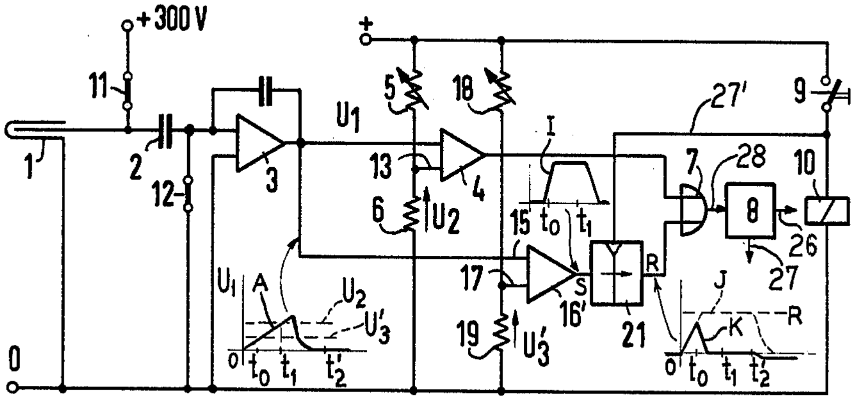
FIG. 2 is a detailed circuit diagram illustrating a second embodiment of the invention.

In the exemplary embodiment according to FIG. 2, the same parts as in the exemplary embodiment according to FIG. 1 are provided with the same reference numerals. In FIG. 2, voltage $U_1$ is directly supplied to a differential amplifier 16′ whose output signal controls a time stage 21. Time stage 21 may be an electronic flip-flop circuit (bistable multi-vibrator), for example.

In this example, voltage $U'_3$ is selected such that in the absence of a fault, an output signal I appears on the output of differential amplifier 16′ after a much shorter period of time ($t_0$) as compared with an exposure time ($t_1$). If, for example, differential amplifier 4 delivers a switch-off signal (at time $t_1$) when voltage $U_1$ reaches a voltage of 2V, voltage $U'_3$ can be selected such that the differential amplifier 16′ delivers a logical one output signal (as indicated at I) when the voltage on input 15, that is voltage $U_1$, reaches 0.1V. If the longest exposure time period is five seconds, for example, differential amplifier 16 must deliver its logical one output signal at the latest at time $t_0$, where $t_0 = 5$ (seconds) $\times$ (0.1V/2V) = 0.1 second. The switching time of time stage 21 (after energization of the stage upon closure of switch 9 via conductor 27') is selected corresponding to time $t_0$; that is, time stage 21 is constructed to assume a predetermined one of its stable states corresponding to a logical one output unless an inhibiting signal is received within a time interval extending to time $t_0$, for example within a time interval of 0.1 second. If no inhibiting signal such as indicated at I has been received from differential amplifier 16 within such time limit of 0.1 second, for example, bistable circuit 21 will assume its logical one output condition as indicated at J so as to supply switch-off stage 8 with a switch-off signal via OR gate 7. If no fault is present, differential amplifier 16 will supply the inhibiting signal as indicated by wave form I to block timing stage 21 within the specific period of time such as 0.1 second in the example given, so that the timing stage 21 has an output wave form such as indicated at K and does not switch off the x-ray tube. Thus in the absence of a fault, the switching-off of the x-ray tube occurs only when voltage $U_1$ reaches a voltage value equal to $U_2$; that is, when an optimum film density has been obtained.

As in the previous embodiment, the voltage level $U_2$ may be set to correspond to any value $t_1$ in a range between $t_0$ milliseconds (for example 100 milliseconds) and a maximum exposure time (for example 5 seconds). In this embodiment, however, the voltage level $U_3'$ is adjustable such that with a minimum exceptable rate of increase of wave form A at the output of amplifier 3, the voltage level $U_1$ will reach a level equal to $U_3'$ prior to the minimum desired exposure time setting for the system. Thus, if resistance means 5 has a minimum setting (that is a maximum resistance setting) corresponding to an exposure time of one hundred milliseconds, then resistance means 18 will include a resistance setting such that differential amplifier 16' will supply an inhibiting signal as indicated by wave form I at a corresponding level of voltage $U_1$ (such as 0.1 V where a maximum exposure time corresponds to a value of $U_1$ of 2V).

When the output of amplifier 3 returns to zero volts as indicated by wave form A in FIG. 2, the output of differential amplifier 16' will return to the logical zero condition as indicated by wave form I in FIG. 2. If time circuit 21 is taken as a bistable circuit with its set input connected with the output of differential amplifier 16' and with its reset output connected to a terminal of OR gate 7, then the return of the output of differential amplifier 16' to a logical zero condition would not reset bistable circuit 21, and bistable 21 would remain in its set condition as represented by wave form K. Upon release of switch 9, the switch returns to the open position shown in FIG. 2, and contacts 11 and 12 return to their closed positions as shown. It is assumed with reference to wave form A that at a maximum exposure time $t_2'$, the x-ray source will be turned off independently of the circuit of FIG. 2, so that the actual time of release of switch 9 can be after time $t_2'$. The bistable circuit 21 may be formed with PNP transistors having grounded emitters, and with positive operating potential from conductor 27' being supplied via respective resistors to the respective bases of the transistors. The collector operating potential would then be a supply potential which is negative relative to ground, and in the absence of positive supply potential both transistors would be forward biased sufficiently so that the output of the bistable circuit 21 would remain near ground potential, and this condition has been indicated for wave form K. It is well understood in the art that means may be provided for insuring that upon supply of positive operating potential to such a bistable circuit, the circuit will always assume the desired one of its stable conditions, here the reset condition (in the absence of the inhibiting pulse I to the set input). Simply by way of example, a lesser resistance value may be interposed between conductor 27' and the base of the transistor whose collector is connected to the reset output of the circuit, such that this transistor will be driven toward a cut-off condition in preference to the other transistor (but with desired time delay), and the associated collector driven progressively to a negative potential corresponding to the negative supply voltage. For the sake of conformity with wave form K, it may be assumed that the output from the collector is taken via an inverter stage, so that as the collector tends to become more negative, a corresponding positive going signal is produced at the reset output of bistable circuit 21 as represented in the vicinity of time zero by wave form K. In the particular embodiment illustrated, it is assumed that the turn-on time for relay 10 is small in comparison to the minimum exposure time $t_0$. Where this is not the case, conductor 27' can be disconnected from switch 9 and instead be connected with conductor 27 so that conductor 27 will be connected with the positive supply terminal of bistable circuit 21 via conductor 27'. In this way, the timing cycle of bistable 21 would not begin until such time as relay contacts 11 and 12 were open, and the x-ray source turned on. Thus, the wave form A would begin its increase from zero volts at essentially the same instant of time as the beginning of the timing cycle of bistable circuit 21 regardless of any time delay in the opening of contacts 11 and 12 (since it may be assumed that the time lag in connecting operating potential to conductor 27 would be greater than the time lag in the opening of contacts 11 and 12). The set input of bistable circuit 21 is actuated by a direct current level corresponding to the minimum level of the logical one signal I, and the OR gate 7 is responsive to a direct current level corresponding to the minimum level of the logical one signal J from bistable circuit 21.

FIG. 3 illustrates a block circuit diagram for the purpose of explaining the operation of the circuits according to FIGS. 1 and 2. From FIG. 3, it is apparent that the switch-off circuit 8 is connected via conductor 26 to an x-ray generator 22 which feeds an x-ray tube 23. By way of example, conductor 26 may be thought of as supplying alternating current potential to the primary circuit of the x-ray generator 22. The x-ray generator 22 thus responds to power via conductor 26 to supply high voltage energy to the x-ray tube to produce radiation as indicated by the dash lines which extends through a patient indicated at 24, through the radiation measurement chamber 1 and impinges on the x-ray film 25 to produce the desired exposure. Block **8*a* in FIG. 3 represents the signal processing circuitry of FIG. 1 or of FIG. 2 and is indicated as supplying a switch-off signal via conductor 28 to switch-off circuit 8. Block 8*a* includes components 2 through 7 and 9 through 20 of FIG. 1, or components 2 through 7, 9 through 13, 15, 16', 17, 18, 19 and 21 of FIG. 2. Switch-off stage 8 may include an electronic circuit with a power transistor which controls an electromechanical switch and which switch, in turn, controls supply of power via conductor 26 for switching the x-ray tube 23** on and off.

Figure 3A:
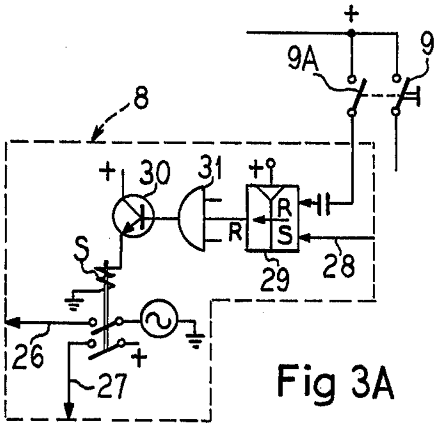
FIG. 3A is a diagrammatic indication of a switch-off device for association with the signal processing circuit of FIG. 1 or FIG. 2.

Simply for the sake of diagrammatical illustration, FIG. 3A shows exemplary details for switch-off device 8. In this circuit, it is assumed that switch 9 controls a further normally open contact 9A which controls a bistable circuit 29. In set condition of bistable circuit 29, it is assumed that a reset output of bistable circuit 29 holds a power transistor 30 in a nonconducting condition via an AND circuit 31. It is further assumed that when switch 9 is actuated, contact 9A supplies a positive voltage pulse to the reset input of bistable 29, placing the bistable in the reset condition and forward biasing transistor 30. The electromechanical switch S controlled by power transistor 30 now serves to close its associated contacts to supply alternating current power to conductor 26 and to supply a suitable direct current operating voltage to conductor 27, such operating potential being suitable for operating differential amplifier 16 in FIG. 1 or for operating bistable circuit 21 of FIG. 2 (as an alternative to the illustrated arrangement with conductor 27'). It will be apparent that details such as indicated in FIG. 3A are by way of example only, and that many suitable operating arrangements will be apparent to those skilled in the art from a consideration of FIGS. 1–3. An AND circuit (44) similar to circuit 31 is indicated in U.S. Pat. No. 3,917,949, and this patent indicates that various conditions including closure of a manual switch may all be required to be present before power is supplied to the primary circuit of an x-ray generator. The difference amplifiers 16 and 16' are operated as threshold value stages or logical comparators supplying a logical one signal level when a first input level (at 15) exceeds a second reference input level ($U_3$ or $U_3'$, respectively, at 17). The amplifier 16 and the bistable 21 act as timing stages since there is a time lag between application of supply voltage to conductor 27 or 27' (at $t=0$), and the issuance of the switch-off signal (E or J) when a fault is present. In FIG. 2, for example, when switch 9 is closed, bistable circuit 21 begins its timing cycle at the same time that the x-ray source 22 is turned on. When switch 9 is opened, bistable circuit 21 returns to a labile initial state and is thus ready for a new timing cycle.

While presently preferred exemplary embodiments have been shown in FIGS. 1 and 2, it will be apparent that many modifications and variations may be effected without departing from the scope of the novel concepts of the present invention.

I claim as my invention:

1. In an x-ray diagnostic apparatus including an automatic exposure timer for controlling the exposure of x-ray film photographs and having a radiation detector, a signal processing circuit connected with said detector, and a switch-off device responsive to a switch-off signal from the signal processing circuit for turning off an x-ray source when the x-ray film has received a predetermined radiation dose, characterized in that the signal processing circuit contains switching means connected to the switch-off device and automatically operable, in the absence of an inhibiting signal during a given time interval after initiation of an exposure, for supplying a switch-off signal to said switch-off device, and inhibiting signal means coupled with said radiation detector and responsive to a signal above a predetermined limit which occurs within said given time interval for supplying an inhibiting signal to said switching means, said switch-off device being operated by said switching means to turn off said x-ray source at the end of said given time interval whenever the signal produced by the radiation detector is below the predetermined limit or if no signal is produced.

2. An x-ray diagnostic apparatus in accordance with claim 1 with said signal processing circuit including an integrator connected to said radiation detector for supplying an output signal as a function of radiation dosage, said inhibiting signal means comprising a differentiating circuit connected with said integrator for supplying a differentiated signal to said switching means which is a function of the rate of change of the output signal with respect to time and which serves to supply said inhibiting signal when the slope of said output signal from said integrator exceeds said predetermined limit within said given time interval.

3. An x-ray diagnostic apparatus according to claim 1 with said signal processing circuit including an integrator connected to said radiation detector for supplying an output signal as a function of radiation dosage, said inhibiting signal means comprising a threshold value stage connected to said integrator for receiving said output signal therefrom, said threshold stage being adjusted to supply said inhibiting signal when said output signal exceeds said predetermined limit, and said switching means comprising a timing circuit controlled by said threshold stage and operable in the absence of the inhibiting signal to complete a timing cycle within said given time interval, and to supply said switch-off signal to said switch-off device in the absence of said inhibiting signal, but being responsive to an inhibiting signal occurring during its timing cycle to inhibit supply of said switch-off signal, said timing circuit thereby serving to turn off said x-ray source if the radiation dosage has not reached a predetermined minimum value within said given time interval.

4. An x-ray diagnostic apparatus according to claim 1 with said signal processing circuit being operative at turn-on of the x-ray source to begin a timing cycle during which said inhibition signal can be effective, and being operative prior to a new exposure to return to an initial condition in preparation for a new timing cycle.

* * * * *